(12) United States Patent
Lee et al.

(10) Patent No.: US 8,777,308 B2
(45) Date of Patent: Jul. 15, 2014

(54) APPARATUS FOR PREVENTING NECK INJURY FOR USE IN VEHICLE SEAT

(75) Inventors: Hyun Ki Lee, Ulsan (KR); Sang Seok Seong, Gyeongju (KR)

(73) Assignees: Hyundai Motor Company, Seoul (KR); Kia Motors Corp., Seoul (KR); Das Co., Ltd., Gyeongbuk (KR)

( * ) Notice: Subject to any disclaimer, the term of this patent is extended or adjusted under 35 U.S.C. 154(b) by 191 days.

(21) Appl. No.: 13/167,417

(22) Filed: Jun. 23, 2011

(65) Prior Publication Data
US 2012/0146370 A1    Jun. 14, 2012

(30) Foreign Application Priority Data
Dec. 9, 2010   (KR) .................. 10-2010-0125417

(51) Int. Cl.
*B60N 2/42*    (2006.01)
(52) U.S. Cl.
USPC .............................. 297/216.14; 297/216.13
(58) Field of Classification Search
USPC ........................ 297/216.13, 216.14
See application file for complete search history.

(56) References Cited

U.S. PATENT DOCUMENTS

| | | | | |
|---|---|---|---|---|
| 5,360,255 A | * | 11/1994 | Cook et al. | 297/232 |
| 5,527,092 A | * | 6/1996 | Cook et al. | 297/232 |
| 5,788,326 A | * | 8/1998 | Kawade et al. | 297/236 |
| 5,810,417 A | * | 9/1998 | Jesadanont | 296/68.1 |
| 6,244,656 B1 | * | 6/2001 | Mueller | 297/216.13 |
| 6,354,659 B1 | * | 3/2002 | Andersson et al. | 297/216.14 |
| 6,938,953 B2 | * | 9/2005 | Håland et al. | 297/216.14 |
| 7,077,471 B2 | * | 7/2006 | Schumann et al. | 297/216.1 |
| 7,497,512 B2 | * | 3/2009 | White et al. | 297/85 R |
| 7,604,081 B2 | * | 10/2009 | Ootani et al. | 180/282 |
| 7,766,424 B2 | * | 8/2010 | Haglund | 297/216.13 |
| 7,854,477 B2 | * | 12/2010 | Axelsson et al. | 297/216.13 |
| 2006/0273631 A1 | * | 12/2006 | White et al. | 297/85 |
| 2009/0001786 A1 | * | 1/2009 | Haglund | 297/216.14 |

FOREIGN PATENT DOCUMENTS

| | | |
|---|---|---|
| JP | 5-40358 U | 6/1993 |
| JP | 4026856 B2 | 10/2007 |
| JP | 2007-296925 A | 11/2007 |
| KR | 10-0324680 B1 | 2/2002 |

* cited by examiner

*Primary Examiner* — David E Allred
(74) *Attorney, Agent, or Firm* — Morgan, Lewis & Bockius LLP

(57) ABSTRACT

An apparatus for preventing neck injury for use in a vehicle seat, which is connected between a recliner base installed on a back frame and a plate base on which a seat cushion is provided, may include a front connection link that is hinged to a front part of the recliner base at an upper end thereof and to a front part of the plate base at a lower end thereof; and a rear connection link that is hinged to a rear part of the recliner base at an upper end thereof and to a rear part of the plate base at a lower end thereof, wherein the front connection link is pivoted at a greater angle than the rear connection link such that the back frame moves in a forward direction in the event of a vehicle rear-end collision.

11 Claims, 7 Drawing Sheets

APPARATUS FOR PREVENTING NECK INJURY FOR USE IN VEHICLE SEAT

CROSS-REFERENCE TO RELATED APPLICATIONS

The present application claims priority to Korean Patent Application No. 10-2010-0125417 filed on Dec. 9, 2010, the entire contents of which is incorporated herein for purposes by this reference.

BACKGROUND OF THE INVENTION

1. Field of the Invention

The present invention relates, in general, to an apparatus for preventing neck injury for use in a vehicle seat and, more particularly, to an apparatus for preventing neck injury for use in a vehicle seat, in which a seat back moves in a forward upward direction by rotating backwards between a front connection link and a rear connection link in the event of a vehicle rear-end collision, thereby maintaining the stable posture of an occupant and reducing an injury to the neck of the occupant.

2. Description of Related Art

In the event of a vehicle rear-end collision, the occupant of a vehicle generally hits a seat back due to inertia. In this case, the cushion of the seat back must absorb all of the shock, and thus it leaves much to be desired from the viewpoint of relieving the shock. When the shock is too strong, there is a high possibility of causing an injury to the neck of the occupant.

For this reason, a recliner apparatus for adjusting the angle of a seat back or relieving the shock by improving the structure of a recliner has been proposed.

As shown in FIG. 6A, such a recliner apparatus includes an outer side plate 13 that is coupled between a recliner body 10 and a recliner bracket 11 and having a pivot point 12 at an upper end thereof, a folding bracket 16 that is disposed between the outer side plate 13 and the recliner body 10 and is coupled to the pivot point 12, and a front link arm (not shown) and a rear link arm 20 that are disposed between the folding bracket 16 and the recliner body 10 and make link motion possible in such a manner that one side thereof is connected through a pivot shaft 18 and simultaneously the other side thereof is coupled to a lower portion of the recliner bracket 11.

For example, when the body of the occupant hits the seat back and thus applies a load to the seat back in the event of the rear-end collision of the vehicle, the rear link arm 20 rotates about the pivot shaft 18, and thereby the entire seat back including the recliner body 10 and the recliner bracket 11 can be horizontally displaced in a rearward direction. Thus, as shown in FIG. 6C, both the recliner body 10 and the recliner bracket 11 can be rotated in a rearward direction adopting the pivot shaft 18 as a central point of rotation in mutually linked combination with the front link arm (not shown). That is, the seat back is pushed in a rearward diction as soon as the rear-end collision occurs, and thus the head of the occupant is pulled back.

In this seat back of the related art, in the event of the rear-end collision of the vehicle, a posture of the occupant who moves forward in the vehicle cannot be kept safe due to the inertial force, and an occupant who is in a second row seat may be injured by a rearward-moving behavior of a seat back of the first row when the first row seat back moves backward.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for preventing neck injury for use in a vehicle seat, in which a seat back moves in a forward upward direction in the event of a vehicle rear-end collision, thereby maintaining the stable posture of an occupant and reducing an injury to the neck of the occupant.

In an aspect of the present invention, the apparatus for preventing neck injury for use in a vehicle seat, which may be connected between a recliner base installed on a back frame and a plate base on which a seat cushion may be provided, may include a front connection link that may be hinged to a front part of the recliner base at an upper end thereof and to a front part of the plate base at a lower end thereof, and a rear connection link that may be hinged to a rear part of the recliner base at an upper end thereof and to a rear part of the plate base at a lower end thereof, wherein the front connection link may be pivoted at a greater angle than the rear connection link such that the back frame moves in a forward direction in the event of a vehicle rear-end collision.

The front connection link may be oriented in a forward direction with a predetermined acute angle from an imaginary vertical line while the vehicle rear-end collision may be not applied to the vehicle seat.

The apparatus may further include a deformation member that may be hinged to the recliner base at one end thereof between the front part and the rear part of the recliner base and to at least one of the front and rear connection links at the other end thereof, wherein the deformation member may include a bent part bent in a reverse U shape between the front and the rear of the plate base in order to absorb a shock in the event of the vehicle rear-end collision.

The apparatus may further include an elastic member that provides a tensile force to the upper end of the front connection link toward the upper end of the rear connection link.

The plate base may include a stopper for limiting a pivotal angle of the front connection link within a predetermined angle, wherein the predetermined angle ranges from a predetermined acute angle from an imaginary vertical line in a forward direction and to a predetermined acute angle from the imaginary vertical line in a rearward direction, and wherein the front connection link may include an arcuate catch slot formed along a rotation radius of the front connection link centering at a pivotal point joining the front connection link with the plate base, and the stopper of the plate base may be slidable engaged with the catch slot.

A distance between the upper end of the front connection link and the upper end of the rear connection link may be shorter than a distance between the lower end of the front connection link and the lower end of the rear connection link, so that the front connection link and the rear connection link may be inclined between the recliner base and the plate base.

The upper end of the front connection link may be disposed below the upper end of the rear connection link, and the lower end of the front connection link may be disposed below the lower end of the rear connection link.

The upper end of the front connection link and the upper end of the rear connection link may be inclined in a mutually converging direction, and a pivotal angle of the front connection link may be greater than that of the rear connection link with respect to the plate base.

The first connection link, the second connection link and the back frame may be coupled to the recliner base in series.

According to the neck injury preventing apparatus of the present invention, the following significant effects can be achieved.

First, the neck injury preventing apparatus can safely maintain the posture of an occupant and absorb shock energy to effectively reduce an injury to the neck of the occupant through the forward-moving behavior of a seat back in the event of a vehicle rear-end collision.

Second, the neck injury preventing apparatus can prevent an occupant in a second row seat from being injured by a backward-moving behavior of a first row seat back because the seat back moves in a forward direction in the event of a vehicle rear-end collision, and thus can ensure safety of the occupant in the second row seat.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
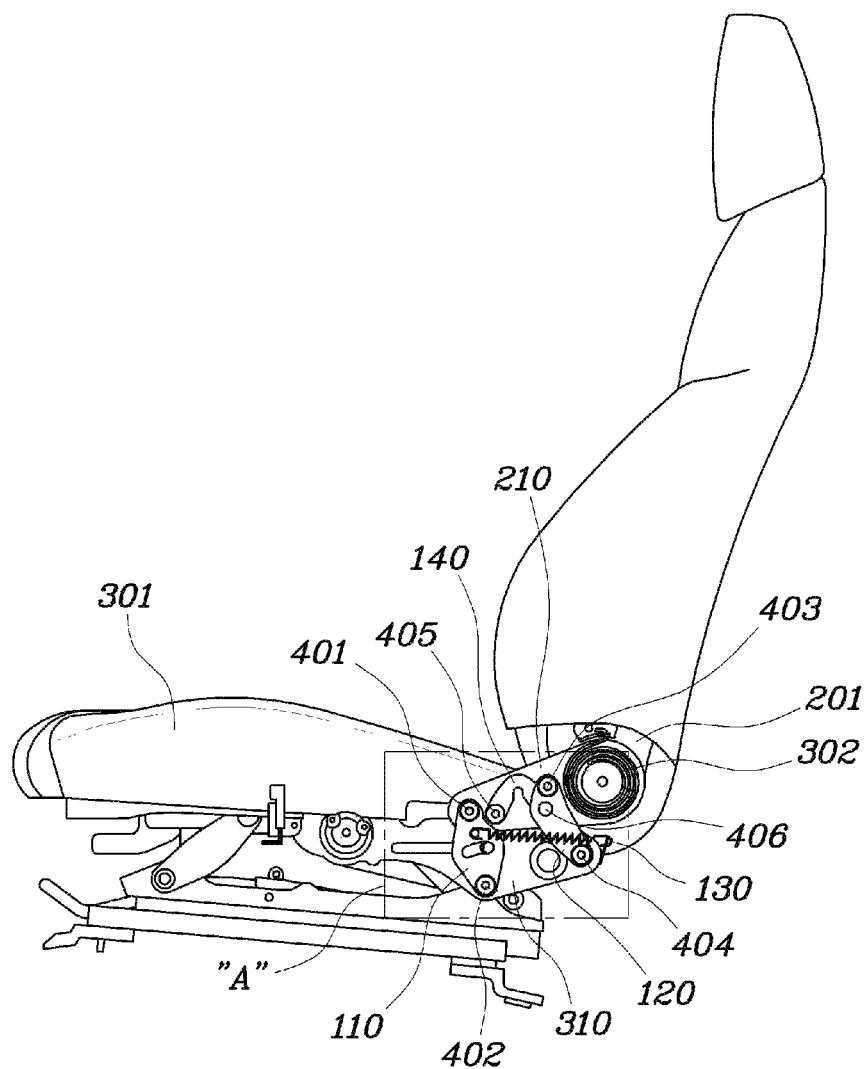
FIG. 1 is a side view showing an apparatus for preventing neck injury for use in a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
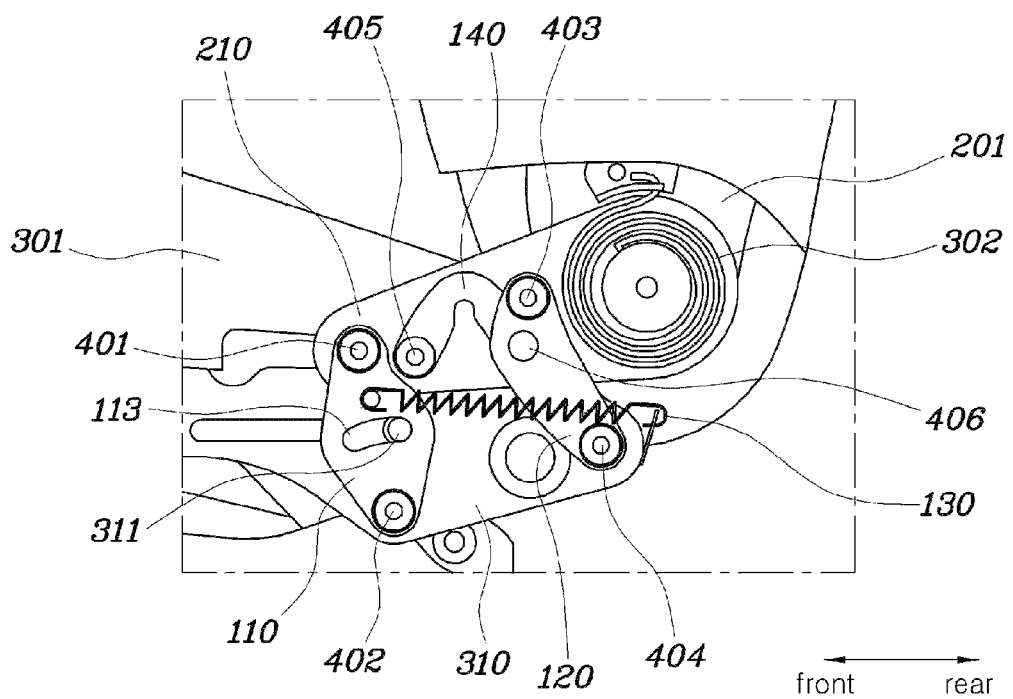
FIG. 2 is an enlarged view showing part "A" of FIG. 1.
Figure 3:
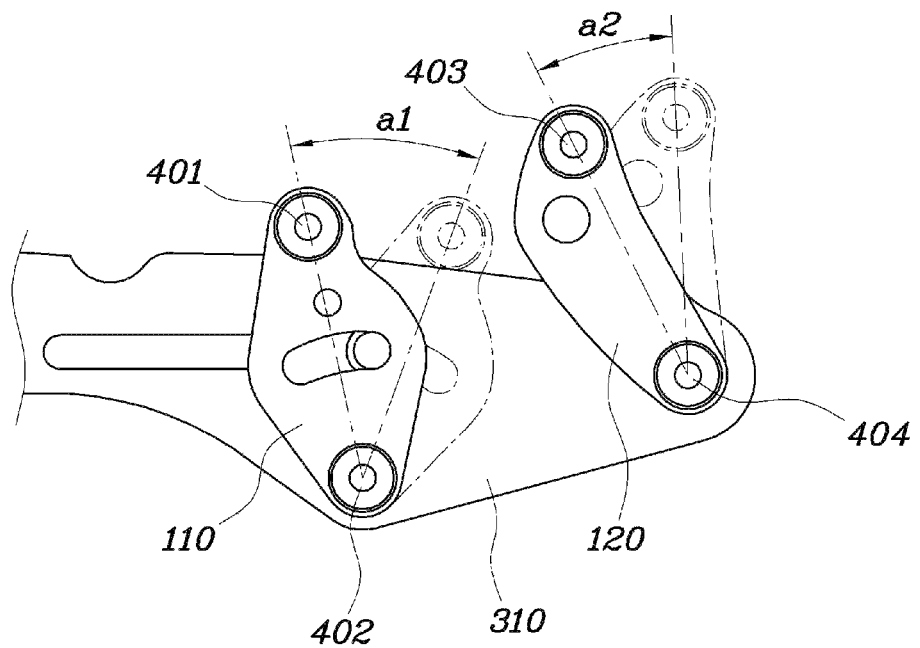
FIG. 3 shows a comparison between pivotal angles of front and rear connection links before and after a vehicle rear-end collision has occurred.

As shown in FIGS. 2 and 3, an apparatus for preventing neck injury for use in a vehicle seat according to an exemplary embodiment of the present invention is designed so that a seat back moves in a forward upward direction due to a link cooperation structure between front and rear connection links 110 and 120 hinged between a recliner base 210 and a plate base 310.

Here, the recliner base 210 is connected to a back frame 201 via an ordinary reclining mechanism 302. Particularly, in the event of a locking operation of the reclining mechanism 302, the recliner base 210 integrally moves along with the back frame 201. In the unlocking operation of the reclining mechanism 302, the back frame 201 can be rotated with respect to the recliner base 210. In the present embodiment, it is defined that the recliner base 210 and the back frame 201 are locked by the reclining mechanism 302, and move integrally in the event of a vehicle rear-end collision.

This neck injury preventing apparatus includes: a front connection link 110 that is connected between a recliner base 210 installed on a back frame 201 and a plate base 310 on which a seat cushion 301 is provided and mutually hinges together a front part of the recliner base 210 and a front part of the plate base 310, a rear connection link 120 that mutually hinges a rear part of the recliner base 210 and a rear part of the plate base 310, an elastic member 130 that provides a tensile force to the front connection link 110, and a deformation member 140 that absorbs shock energy.

The front connection link 110 is a link structure in which opposite ends thereof are connected to the recliner base 210 and the plate base 310, respectively. An upper end of the front connection link 110 is hinged to the front part of the recliner base 210 via a first hinge pin 401, and a lower end of the front connection link 110 is hinged to the front part of the plate base 310 via a second hinge pin 402.

The front connection link 110 is provided with a catch slot 113 into which a stopper 311 of the plate base 310 is inserted. The catch slot 113 is located on a locus of the front connection link 110 rotated about the second hinge pin 402. In the event of the vehicle rear-end collision, the catch slot 113 guides movement of the stopper 311 and restricts pivotal movement of the front connection link 110 within a predetermined angle.

The stopper 311 in the catch slot 113 restricts forward movement of the front connection link 110 under normal conditions, thereby preventing the front connection link 110 from being pivoted by load of the back frame 201. In an exemplary embodiment of the present invention, the front connection link 110 is oriented to the counterclockwise direction with a predetermined acute angle from an imaginary vertical line under normal conditions such that the front and rear connection links 110 and 129 are prevented from pivoting in a clockwise direction of the figure under normal conditions.

The rear connection link 120 is a link structure in which opposite ends thereof are connected to a rear part of the recliner base 210 and a rear part of the plate base 310, respectively. An upper end of the rear connection link 120 is hinged to the rear part of the recliner base 210 via a third hinge pin 403, and a lower end of the rear connection link 120 is hinged to the rear part of the plate base 310 via a fourth hinge pin 404.

Particularly, the rear connection link 120 can realize a forward-moving behavior of the seat back in cooperation with the front connection link 110 in the event of the vehicle rear-end collision. To this end, a distance between the upper end of the front connection link 110 and the upper end of the rear connection link 120 is disposed so as to be shorter than that between the lower end of the front connection link 110 and the lower end of the rear connection link 120, so that the front connection link 110 and the rear connection link 120 are disposed so as to be inclined between the recliner base 210 and the plate base 310.

Here, as shown in FIG. 3, the upper end of the front connection link 110 and the upper end of the rear connection link 120 are inclined in a mutually converging direction. As such, in the event of the vehicle rear-end collision, the upper end of the front connection link 110 and the upper end of the rear connection link 120 can pivot so that a pivotal angle a1 of the upper end of the front connection link 110 is greater than that a2 of the upper end of the rear connection link 120.

More preferably, to realize the forward-moving behavior of the seat back in the event of the vehicle rear-end collision, the upper end of the front connection link 110 is disposed below the upper end of the rear connection link 120, and the lower end of the front connection link 110 is also disposed below the lower end of the rear connection link 120. Thereby, in the event of the vehicle rear-end collision, the upper end of the front connection link 110 can be pivoted at a greater angle than the upper end of the rear connection link 120 in a clockwise direction of the figure, and the recliner base 210 installed on the back frame 201 can be pivoted in a counterclockwise direction of the figure. As a result, the forward-moving behavior of the seat back can be smoothly realized.

The elastic member 130 is an elastic spring applying a tensile force to the upper end of the front connection link 110. One end of the elastic member 130 is connected to the upper end of the front connection link 110, and the other end of the elastic member 130 is connected to the rear part of the plate base 310 adjacent to the lower end of the rear connection link 120, as shown in FIGS. 1-2 and 4-5. Thereby, the elastic member 130 can prevent the front and rear connection links 110 and 120 from being pivoted forward due to the load of the back frame 201.

The deformation member 140 is constructed to be deformed in the event of the vehicle rear-end collision, and absorbs shock energy when deformed by the vehicle collision. One end of the deformation member 140 is hinged to the recliner base 210 via a fifth hinge pin 405, and the other end of the deformation member 140 is connected to an upper portion of the rear connection link 120 via a fixed pin 406, so that the deformation member 140 is disposed between the front and rear of the plate base 310.

The deformation member 140 has a bent part bent in a reverse U shape in order to absorb a shock in the event of the vehicle rear-end collision, and is preferably designed to be deformed when a load of 3 G or more is applied. Thus, when the rear connection link 120 is pivoted by a predetermined load, for instance a load of 3 G or more, applied when the vehicle rear-end collision occurs, the positions of the opposite ends of the deformation member 140 change. The bent part of the deformation member 140 is deformed by the change in position, so that the shock energy generated by the vehicle collision can be absorbed.

Operation of the neck injury preventing apparatus having this construction according to an exemplary embodiment of the present invention will be described below.

Figure 4:
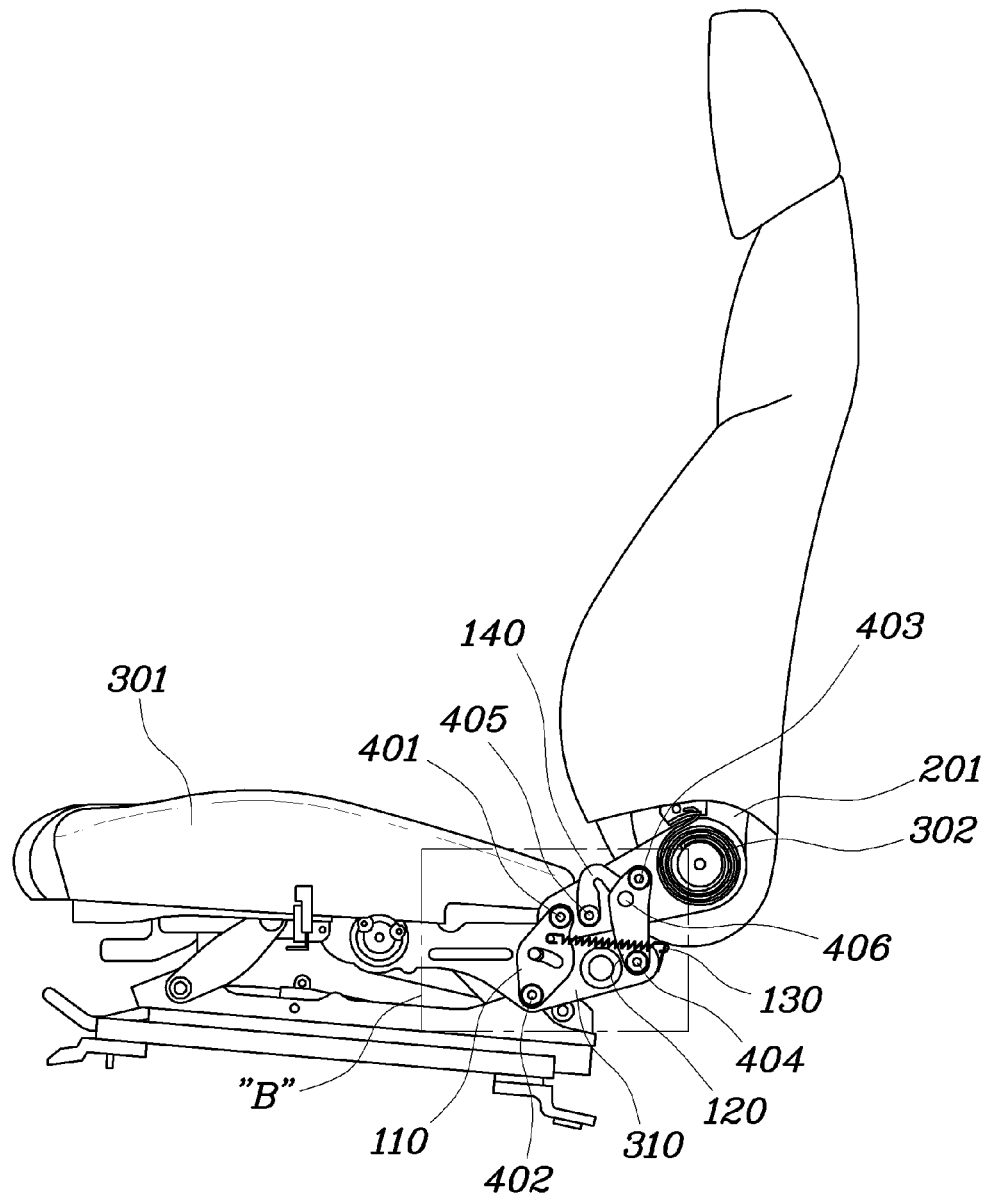
FIG. 4 shows an apparatus for preventing neck injury for use in a vehicle seat according to an exemplary embodiment of the present invention when a vehicle rear-end collision occurs.
Figure 5:
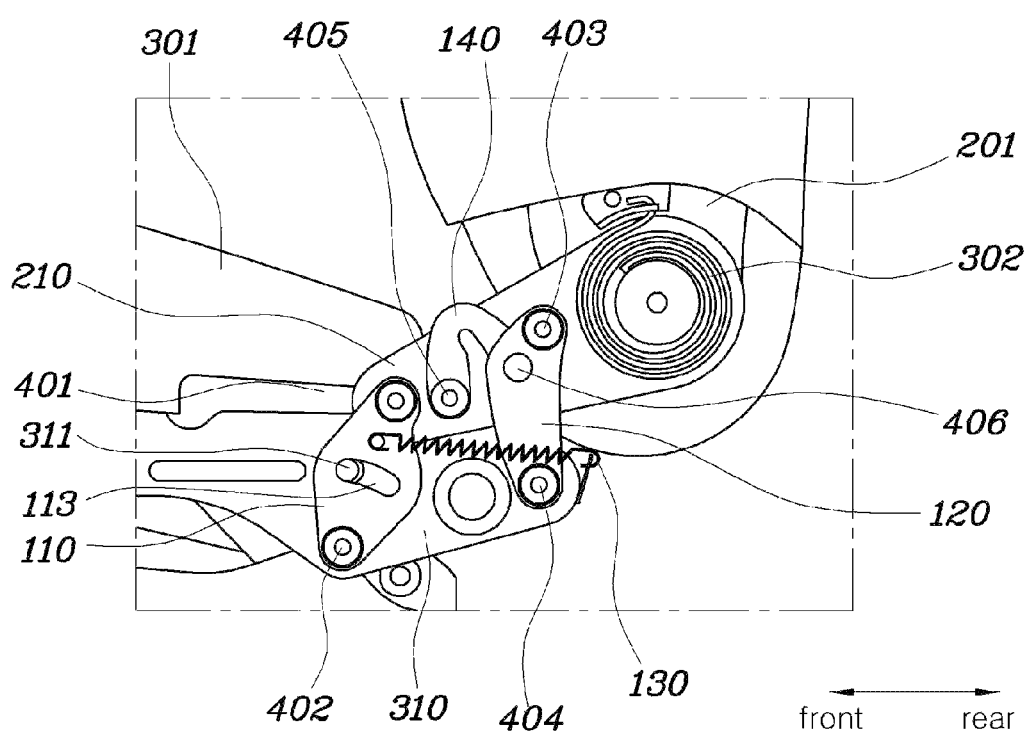
FIG. 5 is an enlarged view showing part "B" of FIG. 4.
Figure 6A:
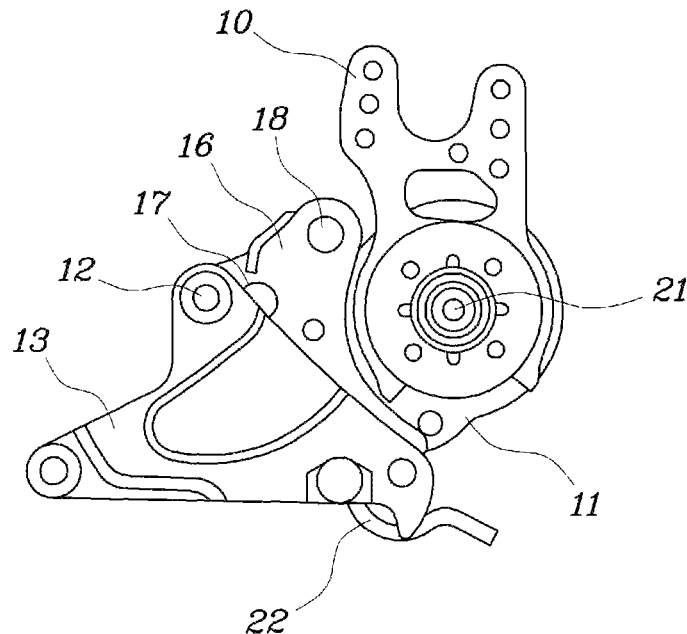
FIGS. 6A through 6C show the operation of a recliner of the related art.
Figure 6B:
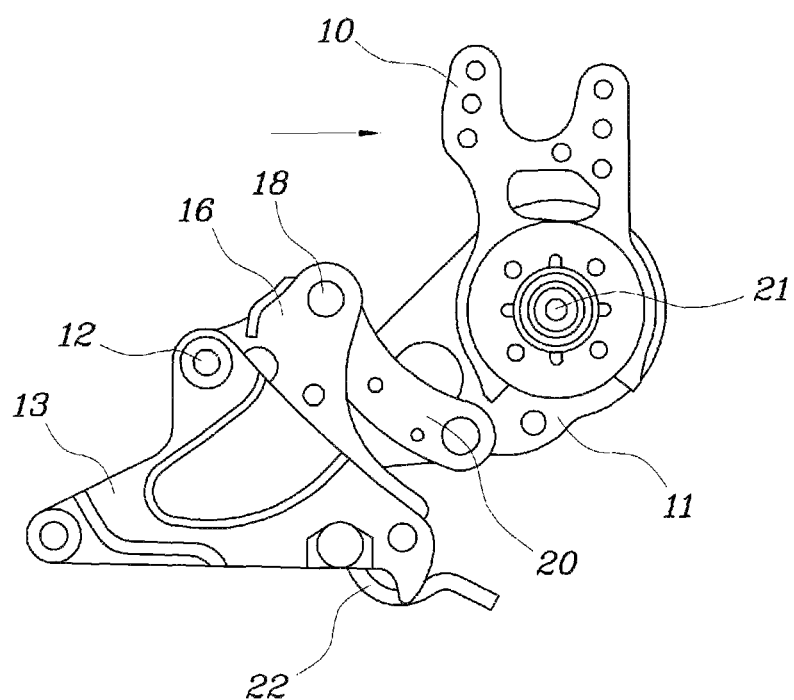
Figure 6C:
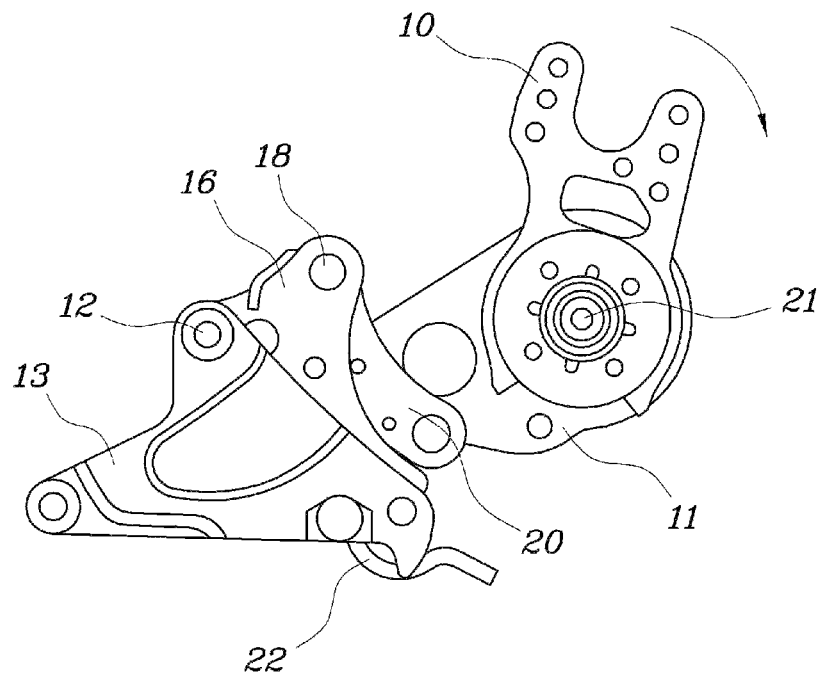

As shown in FIGS. 4 and 5, when a load is applied to the plate base 310 due to a vehicle rear-end collision, the front and rear connection links 110 and 120 are pivoted in a clockwise direction of the figure. Here, since the front connection link 110 is rotated at a greater angle than the rear connection link 120, the front part of the recliner base 210 is pulled in a downward direction.

The stopper 311 of the plate base 310 moves from one end to the other end of the catch slot 113 of the front connection link 110, thereby limiting a pivotal angle of the front connection link 110 to a predetermined angle. As the rear connection link 120 pivots, the corresponding end of the deformation member 140 is subjected to a change in position. Thus, the bent part of the deformation member 140 is deformed to absorb shock energy.

Continuously, when the front part of the recliner base 210 is pulled in a downward direction, the back frame 201 integrally moving along with the recliner base 210 is pivoted in a counterclockwise direction of the figure, and thus moves in a forward direction of the vehicle.

Consequently, the forward-moving behavior of the back frame 201 can stably maintain a posture of the occupant, and reduce the injury to the neck of the occupant. Thus, the occupant in a second row seat cannot be injured by the backward-moving behavior of a first row seat back.

For convenience in explanation and accurate definition in the appended claims, the terms "upper", "lower", "inner", "outer" "upwards" and "forwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for preventing neck injury for use in a vehicle seat, which is connected between a recliner base installed on a back frame and a plate base on which a seat cushion is provided, the apparatus comprising:
    a front connection link having an upper end that is hinged to a front part of the recliner base and a lower end hinged to a front part of the plate base;
    a rear connection link having an upper end hinged to a rear part of the recliner base and a lower end hinged to a rear part of the plate base; and
    an elastic member having a first end connected to the upper end of the front connection link and a second end connected to a rear end of the plate base adjacent to the lower end of the rear connection link, thereby providing a tensile force to the upper end of the front connection link toward the upper end of the rear connection link in an event of a vehicle rear-end collision;
    wherein the front connection link is pivoted at a greater angle than the rear connection link such that the back frame moves in a forward direction in the event of the vehicle rear-end collision.

2. The apparatus as set forth in claim 1, wherein the front connection link is oriented in a forward direction with a predetermined acute angle from an imaginary vertical line while the vehicle rear-end collision is not applied to the vehicle seat.

3. The apparatus as set forth in claim 1, further comprising a deformation member that has a first end hinged to the recliner base between the front part and the rear part of the recliner base and a second end hinged to at least one of the front and rear connection links.

4. The apparatus as set forth in claim 3, wherein the deformation member includes a bent part bent in a reverse U shape between the front and the rear of the plate base in order to absorb a shock in the event of the vehicle rear-end collision.

5. The apparatus as set forth in claim 1, wherein the plate base includes a stopper for limiting a pivotal angle of the front connection link within a predetermined angle.

6. The apparatus as set forth in claim 5, wherein the predetermined angle ranges from a predetermined acute angle from an imaginary vertical line in a forward direction and to a predetermined acute angle from the imaginary vertical line in a rearward direction.

7. The apparatus as set forth in claim 5, wherein the front connection link includes an arcuate catch slot formed along a rotation radius of the front connection link centering at a pivotal point joining the front connection link with the plate base, and the stopper of the plate base is slidably engaged with the catch slot.

8. The apparatus as set forth in claim 1, wherein a distance between the upper end of the front connection link and the upper end of the rear connection link is shorter than a distance between the lower end of the front connection link and the lower end of the rear connection link, so that the front connection link and the rear connection link are inclined between the recliner base and the plate base.

9. The apparatus as set forth in claim 8, wherein the upper end of the front connection link is disposed below the upper end of the rear connection link, and the lower end of the front connection link is disposed below the lower end of the rear connection link.

10. The apparatus as set forth in claim 8, wherein the upper end of the front connection link and the upper end of the rear connection link are inclined in a mutually converging direction, and a pivotal angle of the front connection link is greater than that of the rear connection link with respect to the plate base.

11. The apparatus as set forth in claim 1, wherein the first connection link, the second connection link and the back frame are coupled to the recliner base in series.

* * * * *